United States Patent
Ye et al.

(10) Patent No.: US 9,490,977 B2
(45) Date of Patent: Nov. 8, 2016

(54) METHOD AND APPARATUS FOR ENABLING PHYSICAL LAYER SECRET KEY GENERATION

(75) Inventors: Chunxuan Ye, King of Prussia, PA (US); Alexander Reznik, Titusville, NJ (US); Yogendra C. Shah, Exton, PA (US); Julien Closs, Grenoble (FR); Frederic H. Truco, Gattieres (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1910 days.

(21) Appl. No.: 12/266,435

(22) Filed: Nov. 6, 2008

(65) Prior Publication Data

US 2009/0141900 A1    Jun. 4, 2009

Related U.S. Application Data

(60) Provisional application No. 60/985,775, filed on Nov. 6, 2007, provisional application No. 61/033,195, filed on Mar. 3, 2008, provisional application No. 61/079,320, filed on Jul. 9, 2008.

(51) Int. Cl.
*H04K 1/00* (2006.01)
*H04W 24/00* (2009.01)
*H04B 10/00* (2013.01)
*H04L 9/08* (2006.01)
(Continued)

(52) U.S. Cl.
CPC .............. *H04L 9/0875* (2013.01); *H04K 1/00* (2013.01); *H04L 2209/80* (2013.01); *H04W 12/02* (2013.01); *H04W 12/04* (2013.01)

(58) Field of Classification Search
CPC .. H04L 9/0874; H04L 63/061; H04W 12/02; H04K 1/00

USPC ................... 380/44, 270; 713/600
See application file for complete search history.

(56) References Cited

U.S. PATENT DOCUMENTS 5,563,888 A * 10/1996 Parr ...................... H04L 25/025
                                                    370/516
5,844,946 A * 12/1998 Nagayasu ..................... 375/341
(Continued)

FOREIGN PATENT DOCUMENTS

JP    H 10-513317    12/1998
JP    2004-080663    3/2004
(Continued)

OTHER PUBLICATIONS

Ahlswede et al., "Common Randomness in Information Theory and Cryptography—Part I: Secret Sharing", IEEE Transactions on Information Theory, vol. 39, No. 4, pp. 1121-1132, (Jul. 1993).
(Continued)

*Primary Examiner* — Arvin Eskandarnia
*Assistant Examiner* — Margishi Desai
(74) *Attorney, Agent, or Firm* — Baker & Hostetler LLP

(57) ABSTRACT

A method and apparatus for generating physical layer security keys is provided. Channel impulse response (CIR) measurements are recorded. Each CIR measurement is associated with a time-stamp. Where possible, the time-stamps are paired with time-stamps that are associated with another plurality of CIR measurements. The CIR data associated with the paired time-stamps is aggregated. Each of the aggregated CIR measurements is aligned, and at least one CIR measurement is selected for use in secret key generation.

14 Claims, 8 Drawing Sheets

(51) Int. Cl.
*H04W 12/02* (2009.01)
*H04W 12/04* (2009.01)

(56) References Cited

U.S. PATENT DOCUMENTS

| | | | | |
|---|---|---|---|---|
| 6,904,014 | B1* | 6/2005 | Gai | H04L 47/22 370/230.1 |
| 6,950,400 | B1* | 9/2005 | Tran et al. | 370/236 |
| 7,139,251 | B1* | 11/2006 | Varma | 370/280 |
| 7,388,936 | B2* | 6/2008 | Kocic et al. | 375/346 |
| 7,409,569 | B2* | 8/2008 | Illowsky et al. | 713/323 |
| 7,428,276 | B2* | 9/2008 | Yan | 375/343 |
| 7,965,638 | B1* | 6/2011 | Schzukin | H04L 47/10 370/229 |
| 8,401,196 | B2* | 3/2013 | Goldberg et al. | 380/283 |
| 2002/0029132 | A1* | 3/2002 | Takahashi | 702/191 |
| 2004/0153266 | A1* | 8/2004 | Nygaard, Jr. | 702/68 |
| 2005/0008261 | A1* | 1/2005 | Wolff et al. | 382/305 |
| 2005/0031092 | A1 | 2/2005 | Umemura et al. | |
| 2005/0100215 | A1* | 5/2005 | Nygaard, Jr. | 382/181 |
| 2006/0062333 | A1* | 3/2006 | Yan | 375/340 |
| 2006/0116567 | A1 | 6/2006 | Nilsen et al. | |
| 2006/0132189 | A1* | 6/2006 | Holt et al. | 327/24 |
| 2006/0145082 | A1 | 7/2006 | Stearns et al. | |
| 2007/0058808 | A1* | 3/2007 | Rudolf et al. | 380/44 |
| 2007/0165845 | A1* | 7/2007 | Ye et al. | 380/30 |
| 2008/0112318 | A1* | 5/2008 | Groleau | H04L 47/10 370/230.1 |
| 2008/0126825 | A1* | 5/2008 | Yang | 713/600 |
| 2008/0304658 | A1* | 12/2008 | Yuda et al. | 380/44 |
| 2009/0097456 | A1* | 4/2009 | Zhu | H04W 74/085 370/336 |
| 2010/0042407 | A1* | 2/2010 | Crockett | 704/200.1 |
| 2011/0215831 | A1* | 9/2011 | Holt | 326/30 |
| 2013/0116810 | A1* | 5/2013 | Millington et al. | 700/94 |

FOREIGN PATENT DOCUMENTS

| | | | |
|---|---|---|---|
| JP | 2004-187197 | 7/2004 | |
| JP | 2005130127 A * | 5/2005 | H04L 9/08 |
| JP | 2005-292171 | 10/2005 | |
| JP | 2006-230025 | 8/2006 | |
| JP | 2006-310916 | 11/2006 | |
| WO | 96/23376 | 8/1996 | |
| WO | WO 2006/013798 | 2/2006 | |
| WO | 2006/081122 | 8/2006 | |
| WO | 2006/081306 | 8/2006 | |
| WO | WO 2007/121178 | 10/2007 | |
| WO | WO 2007/124054 | 11/2007 | |
| WO | 2008/010838 | 1/2008 | |

OTHER PUBLICATIONS

Bennett et al., "Generalized Privacy Amplification", IEEE Transactions on Information Theory, vol. 41, No. 6, pp. 1915-1923, (Nov. 1995).
Erceg et al., "TGn Channel Models", IEEE P802.11 Wireless LANs, IEEE 802.11-03/940r4, (May 2004).
Hassan et al., "Cryptographic Key Agreement for Mobile Radio", Digital Signal Processing 6, pp. 207-212, Article No. 0023, (1996).
Koorapaty et al., "Secure Information Transmission for Mobile Radio", IEEE Communications Letters, vol. 4, No. 2, pp. 52-55, (Feb. 2000).
Lan Man Standards Committee of the IEEE Computer Society, "Information Technology—Telecommunications and Information Exchange Between Systems—Local and Metropolitan Area Networks—Specific Requirements—Part 11: Wireless LAN Medium Access Control (MAC) and Physical Layer (PHY) Specifications", ANSI/IEEE Std 802.11, 1999 Editon, (1999).
Mathur et al., "Radio-Telepathy: Extracting a Secret key from an Unauthenticated Wireless Channel", MobiCom'08, (San Francisco, California, USA, Sep. 14-19, 2008).
Maurer, "Secret Key Agreement by Public Discussion from Common Information", IEEE Transactions on Information Theory, Vo. 39, pp. 733-742, (1999).
Third Generation Partnership Project, "Technical Specification Group Radio Access Network; User Equipment (UE) radio transmission and reception (FDD) (Release 5)" 3GPP TS 25.101 V5.11.0, (Jun. 2004).
Third Generation Partnership Project, "Technical Specification Group Radio Access Network; User Equipment (UE) radio transmission and reception (FDD) (Release 5)" 3GPP TS 25.101 V5.20.0, (Jun. 2006).
Third Generation Partnership Project, "Technical Specification Group Radio Access Network; User Equipment (UE) radio transmission and reception (FDD) (Release 6)" 3GPP TS 25.101 V6.15.0, (Sep. 2007).
Third Generation Partnership Project, "Technical Specification Group Radio Access Network; User Equipment (UE) radio transmission and reception (FDD) (Release 6)" 3GPP TS 25.101 V6.18.0, (Sep. 2008).
Third Generation Partnership Project, "Technical Specification Group Radio Access Network; User Equipment (UE) radio transmission and reception (FDD) (Release 7)" 3GPP TS 25.101 V7.9.0, (Sep. 2007).
Third Generation Partnership Project, "Technical Specification Group Radio Access Network; User Equipment (UE) radio transmission and reception (FDD) (Release 7)" 3GPP TS 25.101 V7.13.0, (Sep. 2008).
Third Generation Partnership Project, "Technical Specification Group Radio Access Network; User Equipment (UE) radio transmission and reception (FDD) (Release 8)" 3GPP TS 25.101 V8.0.0, (Sep. 2007).
Third Generation Partnership Project, "Technical Specification Group Radio Access Network; User Equipment (UE) radio transmission and reception (FDD) (Release 8)" 3GPP TS 25.101 V8.4.0, (Sep. 2008).
Ye et al., "On the Secrecy Capabilities of ITU Channels", Proceedings Vehicular Technology Conference, (Fall 2007).
Ye et al., "Secret Key and Private Key Constructions for Simple Multiterminal Source Models", Proceedings International Symposium of Information Theory, pp. 2133-2137, (2005).
Ye et al., Extracting Secrecy from Jointly Gaussian Random Variables, Proceedings International Symposium of Information Theory, pp. 2593-2597, (Jul. 9-14, 2006).
Koorapaty et al., "Secure Information Transmission for Mobile Radio", IEEE Communications Letters, vol. 4, No. 2, pp. 52-55 (Feb. 2000).
LAN MAN Standards Committee of the IEEE Computer Society, "Information Technology—Telecommunications and Information Exchange Between Systems—Local and Metropolitan Area Networks—Specific Requirements—Part 11: Wireless LAN Medium Access Control (MAC) and Physical Layer (PHY) Specifications", ANSI/IEEE Std 802.11, 1999 Edition, (1999).
Third Generation Partnership Project, "Technical Specification Group Radio Access Network; User Equipment (UE) radio transmission and reception (FDD) (Release 5)" 3GPP TS 25.101 V6.15.0, (Sep. 2007).
Ye et al., "Extracting Secrecy from Jointly Gaussian Random Variables", Proceedings International Symposium of Information Theory, pp. 2593-2597, (Jul. 9-14, 2006).
Japanese Patent Application No. JP 2010-533249: Official Notice of Rejection, dated Nov. 2, 2012, 4 pages.

* cited by examiner

METHOD AND APPARATUS FOR ENABLING PHYSICAL LAYER SECRET KEY GENERATION

CROSS REFERENCE TO RELATED APPLICATIONS

This application claims the benefit of U.S. provisional Application Ser. No. 60/985,775, filed Nov. 6, 2007, U.S. provisional Application Ser. No. 61/033,195, filed Mar. 3, 2008, and U.S. provisional Application Ser. No. 61/079,320, filed Jul. 9, 2008, which are incorporated by reference as if fully set forth.

FIELD OF INVENTION

The present invention is related to wireless communication.

BACKGROUND

Although many of the traditional cryptographic techniques may be applicable to wireless communications, these techniques suffer from the problem that the legitimate parties rely on a computational difficulty of obtaining a key by an eavesdropper, as opposed to a mathematical impossibility. As computational power available for an eavesdropper increases, the effectiveness of such methods decreases. Additionally, such methods suffer from a problem that it is usually a simple matter to verify whether a particular guess is correct. Thus, it would be advantageous to construct a cryptographic technique that provides absolute secrecy, rather than one based on computational assumptions. Joint randomness not shared by others (JRNSO) is an example of a theoretical technology that provides absolute secrecy.

In JRNSO Alice and Bob are two wireless transmit receive units (WTRUs), which communicate with each other on a shared frequency. Due to channel reciprocity, channel measurements taken on reciprocal channels by each of the two WTRUs will be very similar if taken at approximately the same time.

If an attacker entity, Eve, is located more than half a wavelength away from either Alice or Bob, the channel measurements by Eve are almost certainly independent from the channel-specific measurements by Alice or Bob. JRNSO utilizes this independence to generate a shared random secret key; however, several challenges arise in implementing JRNSO.

In a proposed implementation of JRNSO, Alice and Bob estimate the channel impulse response (CIR) of the reciprocal wireless channel based on their received radio signals. The output of channel estimation is a CIR measurement, which is composed of highly correlated samples. The CIR measurements by Alice and Bob are then cross-correlated.

The raw CIR data obtained from the CIR data collection system may not be well synchronized, in addition one WTRU may collect more CIR measurements than the other, resulting in some CIR measurements that cannot be paired. Moreover, each collected CIR is composed of a plurality of samples, but not every sample contains useful information about the mutual wireless channel. Therefore it is desirable to provide a method and apparatus for synchronizing and post-processing raw CIR data.

SUMMARY

A method and apparatus for generating physical layer security keys is provided. A plurality of channel impulse response (CIR) measurements are recorded. Each CIR measurement is associated with a time-stamp. Where possible, the time-stamps are paired with time-stamps that are associated with another plurality of CIR measurements. The CIR data associated with the paired time-stamps is aggregated. Each of the aggregated CIR measurements is aligned and at least one sample per CIR measurement is selected for use in secret key generation.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
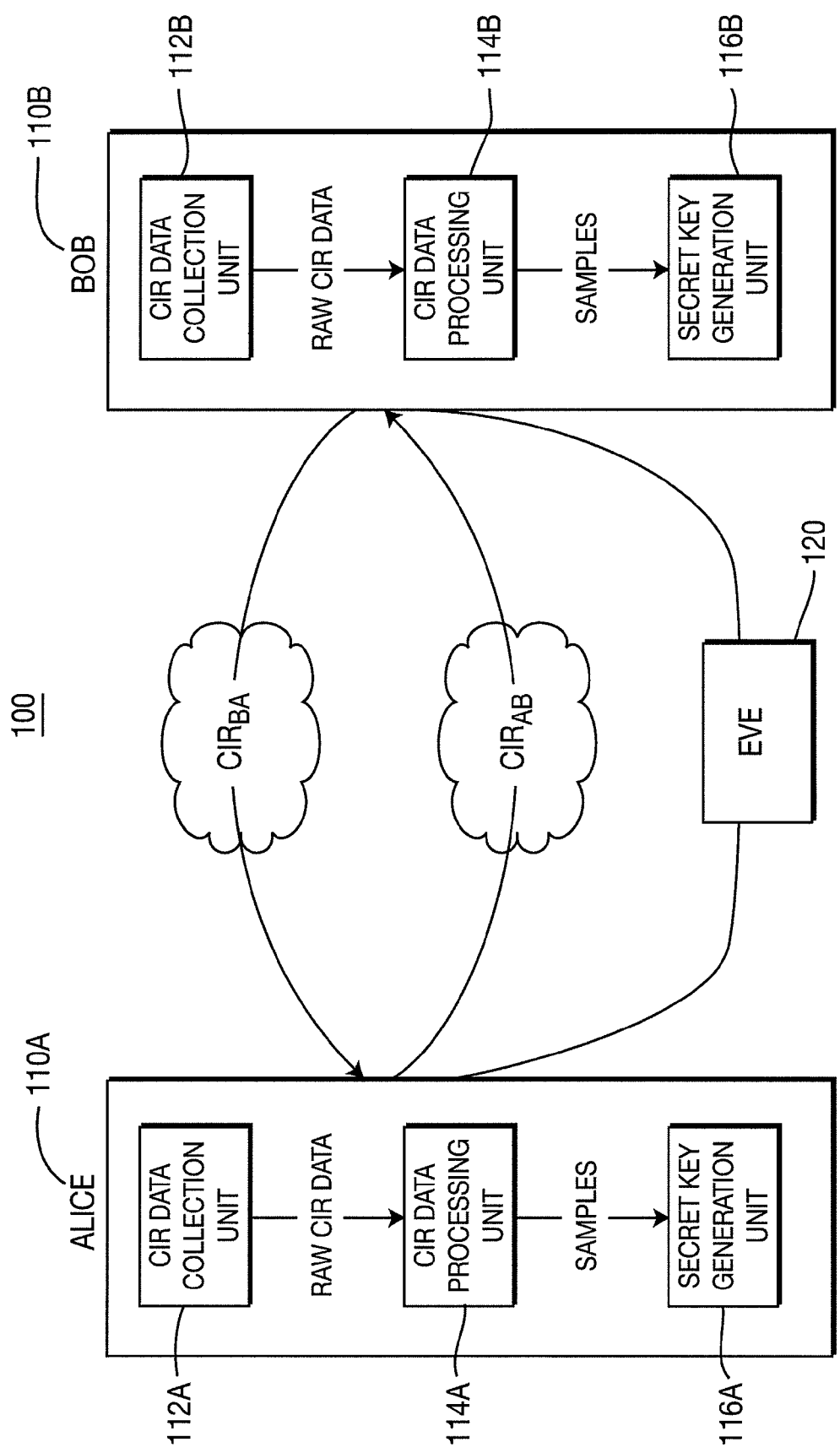
FIG. 1 shows a diagram of communication entities configured to generate shared secret keys.

FIG. 1 shows an exemplary block diagram of a system 100 including two legitimate communicating entities, Alice 110A and Bob 110B, for observing channel impulse response (CIR) data and producing secret keys. Alice 110A and Bob 110B each include a CIR data collection unit 112A, 112B, a CIR data processing unit 114A, 114B, and a secret key generation unit 116A, 116B, respectively.

For each communicating entity, CIR data is measured in the CIR data collection unit 112A, 112B and transmitted to the CIR data processing unit 114A, 114B. The CIR data processing unit 114A, 114B, detailed below, processes the CIR data and produces samples for use in secret key generation. The samples are reported to the secret key generation unit 116A, 116B to produce a secret key.

A communicating entity may be a WTRU, an AP, or any other type of interfacing design capable of operation in a wireless environment. For simplicity, a point-to-point communication system having only two communicating entities 110A, 110B, and a single illegitimate entity, Eve 120, is described in FIG. 1; however, the present invention may be applied to a point-to-multipoint, or multipoint-to-multipoint communication system involving more than two entities.

Figure 2:
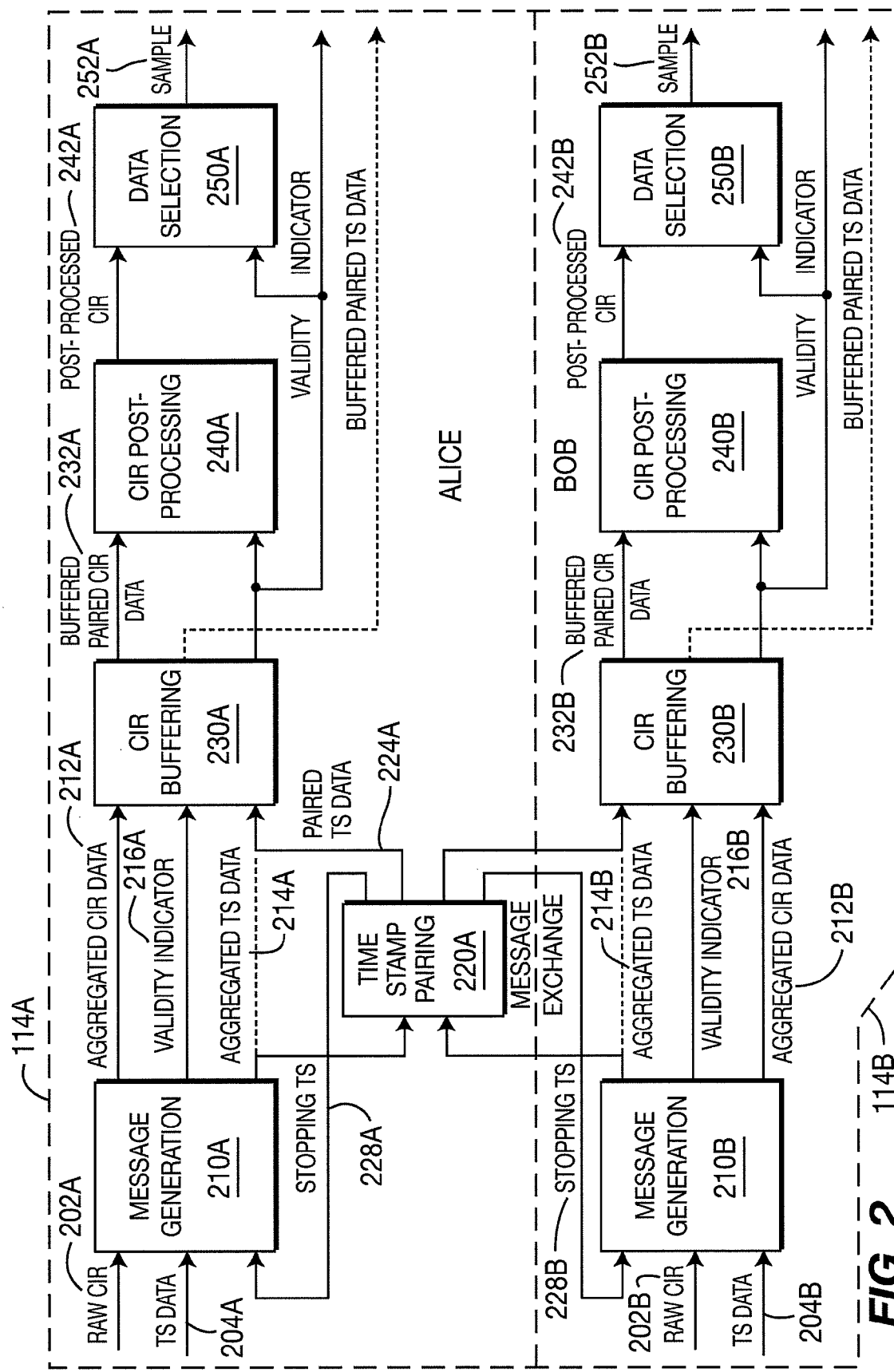
FIG. 2 shows an example block diagram of two exemplary CIR data processing units.

FIG. 2 shows two exemplary CIR data processing units 114A, 114B. The example CIR data processing unit 114A is located at a first WTRU, Alice 110A (as shown in FIG. 1), and the example CIR data processing unit 114B is located at a second WTRU, Bob 110B (as shown in FIG. 1). The example CIR data processing units 114A, 114B each include a message generation unit 210A, 210B; a CIR buffering unit 230A, 230B; a CIR post-processing unit 240A, 240B; and a data selection unit 250A, 250B. A time-stamp pairing unit 220A is shown in CIR data processing unit 114A. CIR data processing unit 114 may include an optional time-stamp pairing unit (not shown), as described below.

The time-stamp pairing unit 220A is shown at Alice 110A only, indicating that transmissions from Alice's message generation unit 210A to the time-stamp pairing unit 220A is local, while transmissions from Bob's message generation unit 210B to the time-stamp pairing unit 220A are conducted through a wireless channel; however, either CIR processing unit 110A, 110B may include a time-stamp pairing unit. For simplicity, wireless transmissions are assumed to be error free.

In an exemplary CIR data processing unit 114A, 114B, raw CIR data 202A, 202B and associated time-stamp (TS) data 204A, 204B are reported to the message generation unit 210A, 210B. The raw CIR data 202A, 202B includes CIR measurements comprising complex samples.

The message generation unit 210A, 210B collects (i.e., aggregates) the raw CIR data 202A, 202B, and the associated TS data 204A, 204B until a threshold of K CIR measurements is reached. Once K CIR measurements are aggregated, they are sent to the CIR buffering unit 230A, 230B as aggregated CIR data 212A, 212B. The message generation also sends the aggregated TS data 214A, 214B, including K time-stamps, to the time-stamp pairing unit 220A. The message generation unit 210A, 210B may also send the TS data 214A, 214B to the CIR buffering unit 230A, 230B.

Optionally, the message generation unit 210A, 210B validates the raw CIR data 202A, 202B, prior to sending the data to the CIR buffering unit 230A, 230B. If an error is detected in the raw CIR data, a negative data validity indicator 216A, 216B is sent to the CIR buffering unit 230A, 230B, to indicate the error. The data validity indicator will then be cascaded through each unit to prevent further processing of the invalid data. Upon receipt of a negative data validity indicator, each unit will flush its memory and forward the negative data validity indicator. A negative data validity indicator will also be sent in the event that any unit fails to receive data for a period greater than T. The period T may be defined for each unit individually.

The message generation unit 210A, 210B may receive a stopping time-stamp 228A, 228B from the time-stamp pairing unit 220A. Upon receipt of a stopping time-stamp 228A, 228B, the message generation unit 210A, 210B expires aggregated data having a time-stamp older than the stopping time-stamp 228A, 228B. Expired data will not be transmitted to the time-stamp pairing unit 220A or the CIR buffering unit 230A, 230B, and will be deleted. Bob's message generation unit 210B receives a similar stopping time-stamp 228B from the time-stamp pairing unit 220A via a wireless channel as discussed above.

The time-stamp pairing unit 220A compares Alice's TS data 214A with Bob's TS data 214B. If one of Alice's time-stamps matches one of Bob's, the two are marked as paired. The paired TS data is sent to Alice's CIR buffering unit 230A and to Bob's CIR buffering unit 230B.

The CIR buffering unit 230A, 230B stores aggregated CIR measurements 212A, 212B that are associated with paired TS data 224A, 224B as paired CIR data 232A, 232B. Some of the aggregated CIR measurements 212A, 212B received at the CIR buffering unit 230A, 230B may not be associated with paired TS data 224A, 224B; these CIR measurements are not aggregated. Once at least L paired CIR measurements are stored, the CIR buffering unit 230A, 230B transmits L paired CIR measurements to the CIR post-processing unit 240A, 240B, and removes the paired CIR data 232A, 232B from memory at the CIR buffering unit 230A, 230B. The value of L may depend on the quantization level and the block size of the error correction code that may be used in the subsequent secret key generation.

Optionally, the CIR buffering unit 230A, 230B may receive and store paired TS data 224A, 224B. When L paired time-stamps are stored, the CIR buffering unit 230A, 230B transmits the stored paired TS data 234A, 234B to the secret key generation unit 116A, 116B (as shown in FIG. 1).

The paired TS data 224A, 224B may include raw TS data, augmented by an indicator for each time-stamp showing whether that time-stamp was paired. Alternatively, the paired TS data 224A, 224B may include only the paired time-stamp values. In another alternative, the paired TS data 224A, 224B includes an ordered list of paired time-stamp indicators, but does not include the TS data directly.

The CIR buffering unit 230A, 230B may include sufficient memory to store K+L CIR data in a circular memory format, such that the last memory slot is considered to be before the first memory slot.

The CIR post-processing unit 240A, 240B cuts, aligns, and normalizes the paired CIR data 232A, 232B and outputs post-processed CIR data 242A, 242B to the data selection unit 250A, 250B. The data selection unit 250A, 250B selects at least one sample from each post-processed CIR measurement. The selected samples 252A, 252B are sent to the secret key generation unit 116A, 116B (as shown in FIG. 1). If more than one sample is selected from each post-processed CIR measurement, a whitening process is applied to the selected CIR data before the samples 252A, 252B are sent to the secret key generation unit 116A, 116B.

Although data is described as being passed among units, one skilled in the art should recognize that a multitude of data management options may be utilized within the scope of the present invention. For example, for each communicating entity, CIR and TS data may be stored in a single memory unit, which is then accessed by the respective CIR data processing unit 114A, 114B, and the respective secret key generation unit 116A, 116B.

Figure 3A:
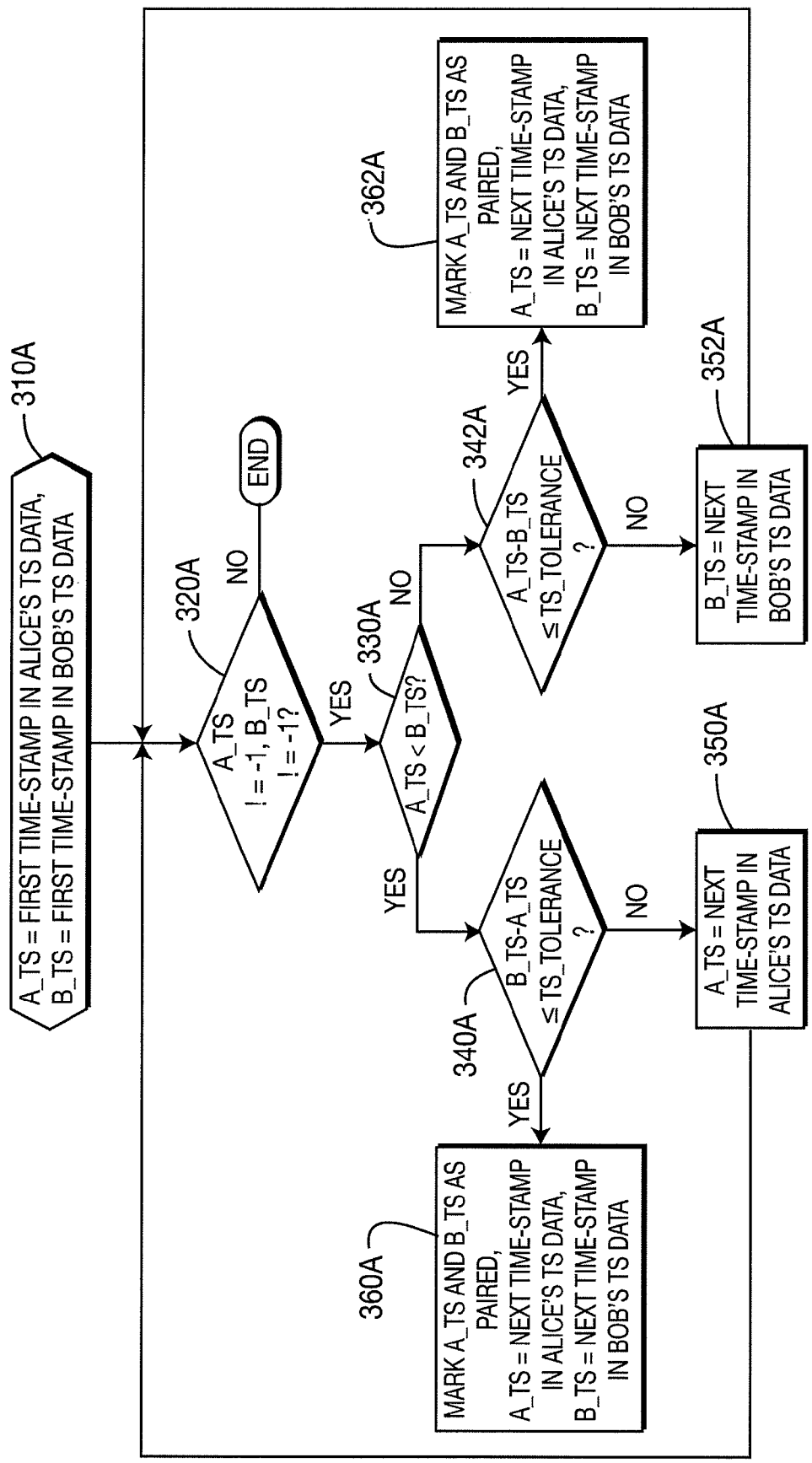
FIG. 3A shows an example flow chart of a time-stamp alignment procedure without wrap around.

FIG. 3A shows an example of time pairing as may be performed by time-stamp pairing unit 220A. Time-stamp pairing is the process of aligning TS data so as to identify and pair TS data from Alice 110A with TS data from Bob 110B. Prior to CIR measurement, Alice 110A and Bob 110B synchronize their respective clocks so that the measured TS data will be similar. CIR and TS data is then measured and aggregated as described above. This data is reported to the time-stamp pairing unit 220A as two sets of TS data. Each set contains K TS measurements in chronological order. TS data from one set are paired with TS data from the other set, where possible, and the paired TS data is reported to CIR buffering unit 230A, 230B. For simplicity, time pairing will be described with reference to time-stamps; however, it should be understood that, rather than recording timestamps, Alice 110A and Bob 110B may each maintain a local counter that is incremented by 1 for each time unit according to their respective local clock, and may record the value of the local counter as the TS data.

To facilitate clock synchronization Alice 110A sends a time-stamped signal, or beacon, to Bob 110B. Bob 110B computes and records a time offset as the difference between his clock and the time reported by Alice 110A. Later, during the CIR collection process, when Bob 110B receives a signal from Alice 110A, he sets the associated time-stamp as the reception time of the signal, based on his local timer, plus the previously calculated time offset. Alice 110A, on the other hand, sets the time-stamp associated with a received message as the reception time of the signal, based on her local timer.

Optionally, clock synchronization may be performed throughout the CIR collection process if Alice and Bob do not include other sufficiently accurate clock synchronization methods. Alice 110A intermittently transmits beacon signals to Bob 110B during CIR collection. Each beacon signal contains an updated time-stamp. Bob 110B updates the time offset accordingly. If time synchronization is performed relatively frequently, at a time interval of 100 milliseconds, then time drift does not cause large differences between the time-stamps for the CIR data. Small time differences will be corrected by subsequent alignment.

Alternatively, clock synchronization may be performed at the start and end of the CIR collection process and Bob's time-stamps are adjusted to match Alice's through linear alignment. Alice 110A and Bob 110B synchronize at the beginning of the CIR data collection process as previously discussed. Rather than transmitting intermittent beacon signals to Bob 110B, Alice 110A sends a beacon signal at the end of the CIR collection process. Bob 110B calculates the time drift occurring between the two beacon signal time-stamps, based upon the corrected time offset for the two beacon packets. The time interval and the time drift are then used to compute a correction factor to be applied to each of Bob's time-stamps. Each CIR time-stamp collected at Bob's side is then adjusted by adding the correction factor and the difference between the CIR time-stamp and the first beacon time-stamp.

Alice's time-stamp pairing unit 220A receives aggregated TS data 214A from Alice's message generation unit 210A, and aggregated TS data 214B from Bob's message generation unit 210B. Each list of TS data 214A, 214B is chronologically ordered. A time-stamp from Alice's TS data 214A is considered paired to a time-stamp from Bob's TS data 214B if they are within TS_Tolerance time units. Therefore, TS_Tolerance denotes the largest allowable time interval between paired time-stamps. TS_Tolerance should be set to be much less than the channel coherence time, but should be longer than the reasonable time delay between Alice and Bob based on other factors, such as time drift, propagation delay, and data processing run-time. Although several time pairing methods are described below, it should be understood that the TS data 214A, 214B may be paired according to any appropriate ordered list comparison method. An impossible value, such as −1, is appended to the TS data after the last time-stamp.

FIG. 3A show an example of time-stamp pairing. The first time-stamp from Alice's aggregated TS data 214A is selected as A_TS and the first time-stamp from Bob's aggregated TS data 214B is selected as B-TS (310A). The values of A_TS and B_TS are then compared to an impossible time stamp value, −1 (320A).

If A_TS and B_TS are non negative, A_TS and B_TS are compared (330A). If A_TS is less than B_TS, the value of A_TS subtracted from B_TS is compared with the TS_Tolerance value (340A). If A_TS subtracted from B_TS is greater than TS_Tolerance, A_TS is set to the value of the next time-stamp in Alice's TS data (350A), and the process is repeated from 320A.

If A_TS subtracted from B_TS is not greater than TS_Tolerance, the pairing of A_TS and B_TS is recorded, A_TS is set to the value of the next time-stamp in Alice's TS data, B_TS is set to the value of the next time-stamp in Bob's TS data (360A), and the process is repeated from 320A.

If A_TS is not less than B_TS, the value of B_TS subtracted from A_TS is compared with the TS_Tolerance value (342A). If B_TS subtracted from A_TS is greater than TS_Tolerance, B_TS is set to the value of the next time-stamp in Bob's TS data (352A), and the process is repeated from 320A.

If B_TS subtracted from A_TS is not greater than TS_Tolerance, the pairing of A_TS and B_TS is recorded, A_TS is set to the value of the next time-stamp in Alice's TS data, B_TS is set to the value of the next time-stamp in Bob's TS data (362A), and the process is repeated from 320A.

A time-stamp may be composed of a bit sequence that wraps around (repeats) periodically. For example, a time-stamp composed of 26 bits, with a precision of 1 microsecond will wrap around approximately every 67 seconds (226 microseconds). The maximum time-stamp value may be denoted as TS_Max. The point at which a wrap around event is recognized may be denoted as TS_Wrap. The value of TS_Wrap will be slightly less than TS_Max, much larger than the interval of two transmissions, and much larger than TS_Tolerance. For example, TS_Wrap may be set as 9/10 of TS_Max.

Figure 3B:
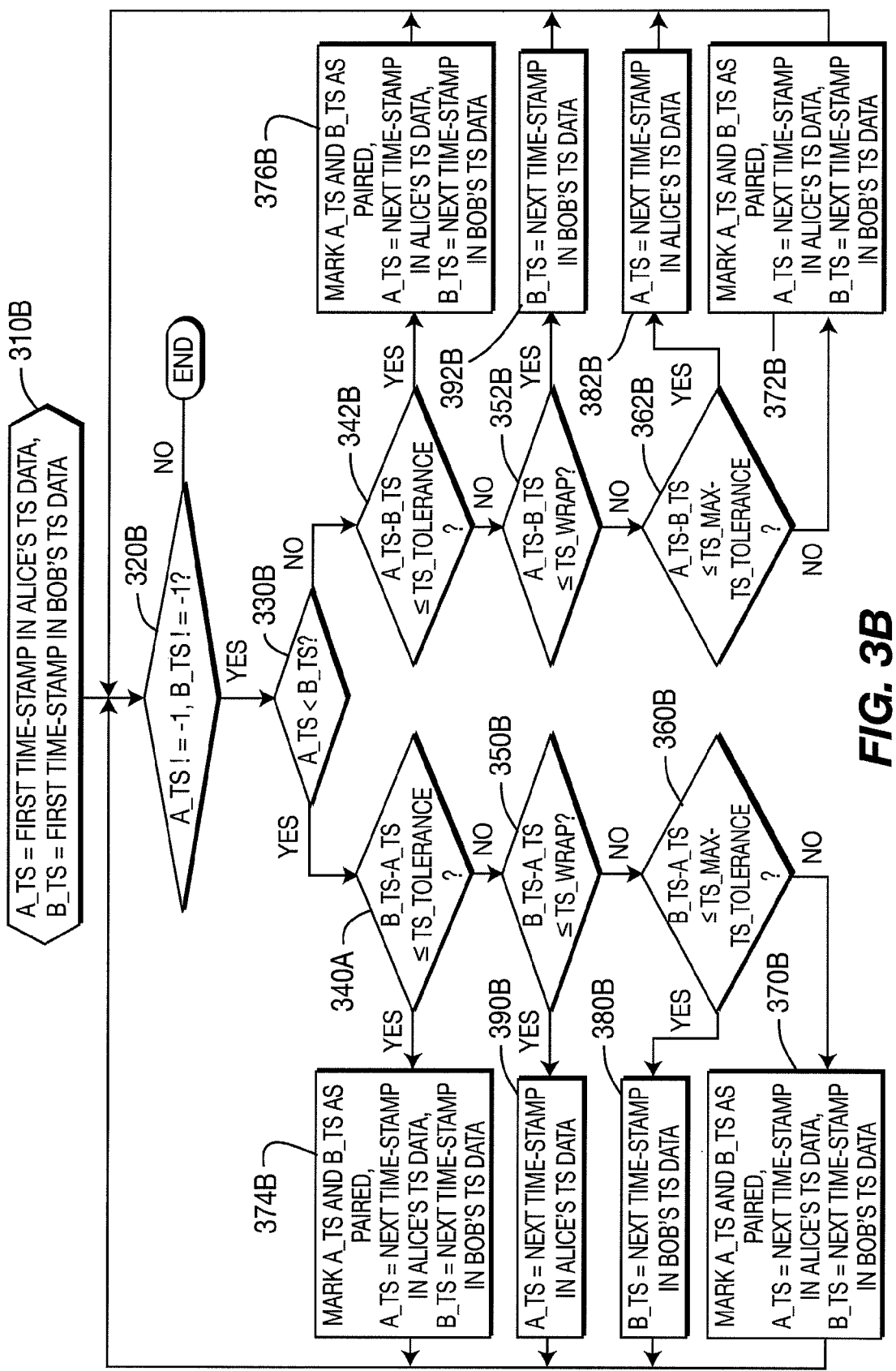
FIG. 3B shows an example flow chart of a time-stamp alignment procedure with wrap around.

FIG. 3B shows another example of time-stamp pairing. The first time-stamp from Alice's TS data is selected as A_TS and the first time-stamp from Bob's TS data is selected as B-TS (310B). The values of A_TS and B_TS are then compared to an impossible time stamp value, −1 (320B).

If A_TS and B_TS are non negative, the values of A_TS and B_TS are then compared (330B). If A_TS is less than B_TS, the value of A_TS subtracted from B_TS (hereinafter B1) is compared with the TS_Tolerance value (340B). If B1 is greater than TS_Tolerance, B1 is compared to the value of TS_Wrap (350B). If B1 is greater than TS_Wrap, B1 is compared to the value of TS_Tolerance subtracted from TS_Max (hereinafter B2)(360B). If B1 is greater than B2, the pairing of A_TS and B_TS is recorded, A_TS is set to the value of the next time-stamp in Alice's TS data, B_TS is set to the value of the next time-stamp in Bob's TS data (370B), and the process is repeated from 320B.

If B1 is not greater than B2, B_TS is set to the value of the next time-stamp in Bob's TS data (380B) and the process is repeated from 320B.

If B1 is not greater than TS_Wrap, A_TS is set to the value of the next time-stamp in Alice's TS data (390B), and the process is repeated from 320B.

If B1 is not greater than TS_Tolerance, the pairing of A_TS and B_TS is recorded (342B), A_TS is set to the value of the next time-stamp in Alice's TS data, B_TS is set to the value of the next time-stamp in Bob's TS data (374B), and the process is repeated from 320B.

If A_TS is greater than B_TS, the value of B_TS subtracted from A_TS (hereinafter B3) is compared with the TS_Tolerance value (342B). If B3 is greater than TS_Tolerance, B3 is compared to the value of TS_Wrap (352B). If B3 is greater than TS_Wrap, B3 is compared to B2 (362B). If B3 is greater than B2, the pairing of A_TS and B_TS is recorded (374B), A_TS is set to the value of the next time-stamp in Alice's TS data, B_TS is set to the value of the next time-stamp in Bob's TS data (372B), and the process is repeated from 320B.

If B3 is not greater than B2, A_TS is set to the value of the next time-stamp in Alice's TS data (382B) and the process is then repeated from 320B.

If B3 is not greater than TS_Wrap, B_TS is set to the value of the next time-stamp in Bob's TS data (392B) and the process is repeated from 320B.

If B3 is not greater than TS_Tolerance, the pairing of A_TS and B_TS is recorded, A_TS is set to the value of the next time-stamp in Alice's TS data, B_TS is set to the value of the next time-stamp in Bob's TS data (376B), and the process is repeated from 320B.

Figure 3C:
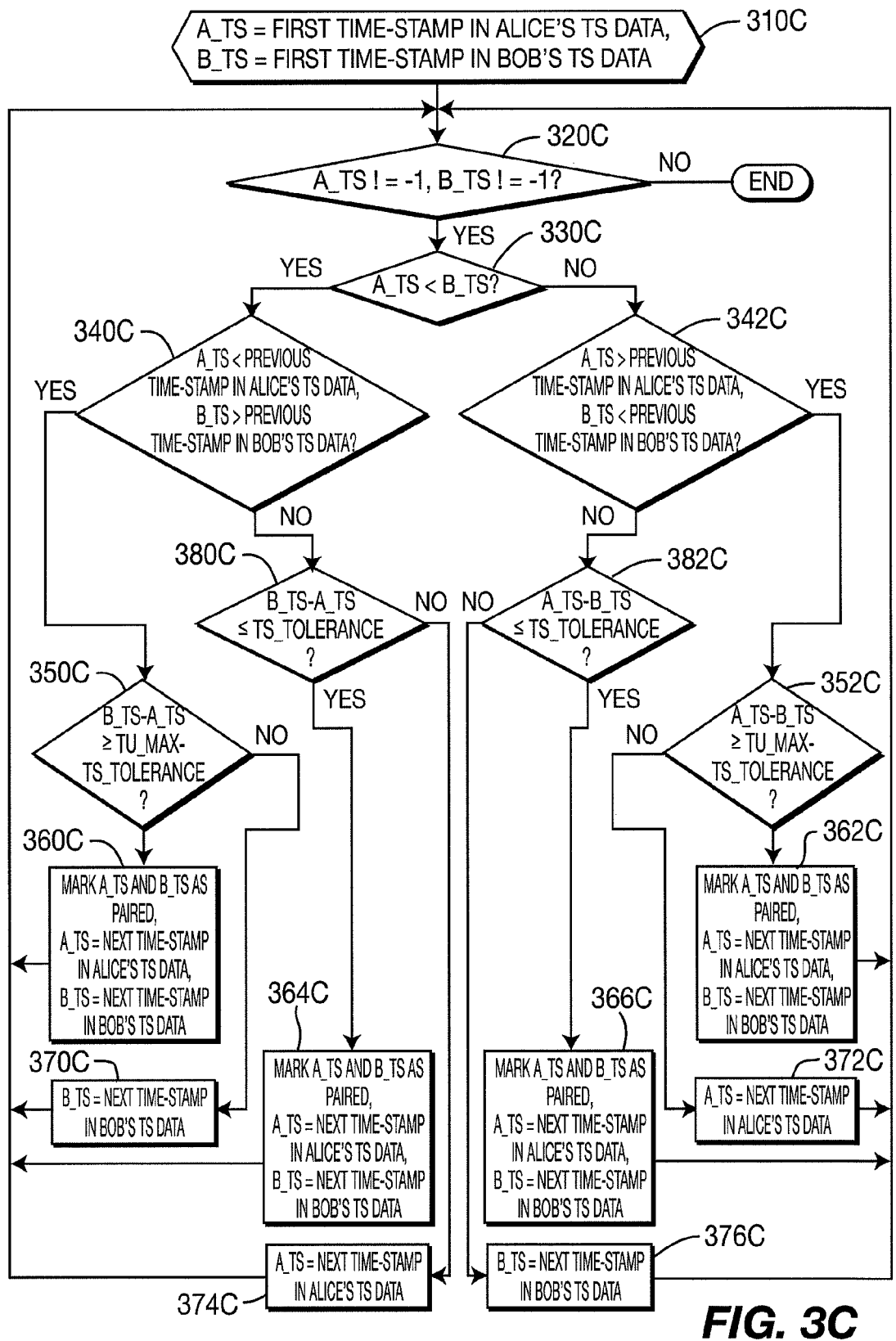
FIG. 3C shows an example flow chart of an alternative time-stamp alignment procedure with wrap around.

FIG. 3C shows another example of time-stamp pairing with wrap around, without the use of TS_Wrap. The first time-stamp from Alice's TS data is selected as A_TS and the first time-stamp from Bob's TS data is selected as B_TS (310C). The values of A_TS and B_TS are then compared to an impossible time stamp value, −1 (320C).

If A_TS and B_TS are non negative, the values of A_TS and B_TS are then compared (330C). If A_TS is less than B_TS, A_TS is compared to the previous time-stamp in Alice's TS data, and B_TS is compared to the previous time-stamp in Bob's TS data (340C). If A_TS is less than the previous time-stamp in Alice's TS data and B_TS is greater than the previous time-stamp in Bob's TS data, then A_TS subtracted from B_TS (hereinafter C1) is compared to TS_Tolerance subtracted from TS_Max (hereinafter C2) (350C). If C1 is less than C2, B_TS is set to the value of the next time-stamp in Bob's TS data (370C) and the process is repeated from 320C.

If C1 is not less than C2, the pairing of A_TS and B_TS is recorded, A_TS is set to the value of the next time-stamp in Alice's TS data, B_TS is set to the value of the next time-stamp in Bob's TS data (360C), and the process is repeated from 320C.

If A_TS is not less than the previous time-stamp in Alice's TS data or B_TS is not greater than the previous time-stamp in Bob's TS data, then C1 is compared to TS_Tolerance (380C). If C1 is greater than TS_Tolerance, A_TS is set to the next time-stamp in Alice's TS data (374C) and the process is repeated from 320C.

If C1 is not greater than TS_Tolerance, the pairing of A_TS and B_TS is recorded, A_TS is set to the value of the next time-stamp in Alice's TS data, B_TS is set to the value of the next time-stamp in Bob's TS data (364C), and the process is repeated from 320C.

If A_TS is not less than B_TS, A_TS is compared to the previous time-stamp in Alice's TS data, and B_TS is compared to the previous time-stamp in Bob's TS data (342C). If A_TS is greater than the previous time-stamp in Alice's TS data and B_TS is less than the previous time-stamp in Bob's TS data, then B_TS subtracted from A_TS (hereinafter C3) is compared to C2 (352C). If C3 is less than C2, A_TS is set to the value of the next time-stamp in Alice's TS data (372C) and the process is repeated from 320C.

If C3 is not less than C2, the pairing of A_TS and B_TS is recorded, A_TS is set to the value of the next time-stamp in Alice's TS data, B_TS is set to the value of the next time-stamp in Bob's TS data (362C), and the process is repeated from 320C.

If A_TS is not greater than the previous time-stamp in Alice's TS data or B_TS is not less than the previous time-stamp in Bob's TS data, then C3 is compared to TS_Tolerance (382C). If C3 is greater than TS_Tolerance, B_TS is set to the next time-stamp in Bop's TS data (376C) and the process is repeated from 320C.

If C3 is not greater than TS_Tolerance, the pairing of A_TS and B_TS is recorded, A_TS is set to the value of the next time-stamp in Alice's TS data, B_TS is set to the value of the next time-stamp in Bob's TS data (366C), and the process is repeated from 320C.

Alternatively, Alice's time-stamp pairing unit 220A may maintain a counter for each set of TS data 214A, 214B, and a count of the total number of time-stamps in the TS data. The TS data will be processed as discussed above, and each counter will be advanced when the respective time-stamp is advanced. time-stamp pairing will be complete when either counter exceeds the respective count of time-stamps.

Alice's TS data 214A may be offset from Bob's TS data 214B. For example, Alice may begin recording data before Bob. As a result, the time-stamps at the end of Alice's TS data 214A will match the time-stamps at the beginning of Bob's. During time-stamp pairing the time-stamps at the end of Bob's TS data 214B will not be paired. Instead, these time-stamps are marked as unknown and preserved for later pairing. The time-stamps that fall after a specific time, called the stopping time 228A, 228B, are unknown time-stamps.

The stopping time for both Alice and Bob may be the last paired time-stamp. Alternatively, the last time-stamp value in Alice's TS data may be compared with the last time-stamp value in Bob's TS data. If Alice's time-stamp is smaller, it is set as Alice's stopping TS 228A. Bob's stopping TS 228B is set to the value of the largest time-stamp in Bob's TS data that is smaller than Alice's stopping TS 228A. If Alice's last time-stamp is larger than Bob's last time-stamp, Bob's stopping TS 228B is set to the value of Bob's last time-stamp and Alice's stopping TS 228A is set to the largest time-stamp in Alice's TS data that is smaller than Bob's stopping TS 228B.

Alternatively, Bob may send a list of time-stamp pairing candidates to Alice. Upon receipt of Bob's time-stamp pairing candidate list Alice compares the list with her own time-stamp pairing candidates to generate a list of paired time-stamps. Alice reports the list of paired time-stamps to Bob. Alice and Bob each delete time-stamp pairing candidates that are not paired.

When time-stamp pairing is complete, the paired TS data is reported to Alice's CIR buffering unit 330A and to Bob's CIR buffering unit 330B. Alice's stopping TS 228A is reported to Alice's message generation unit 310A. Bob's stopping TS 228B is reported to Bob's message generation unit 310B.

Figure 4:
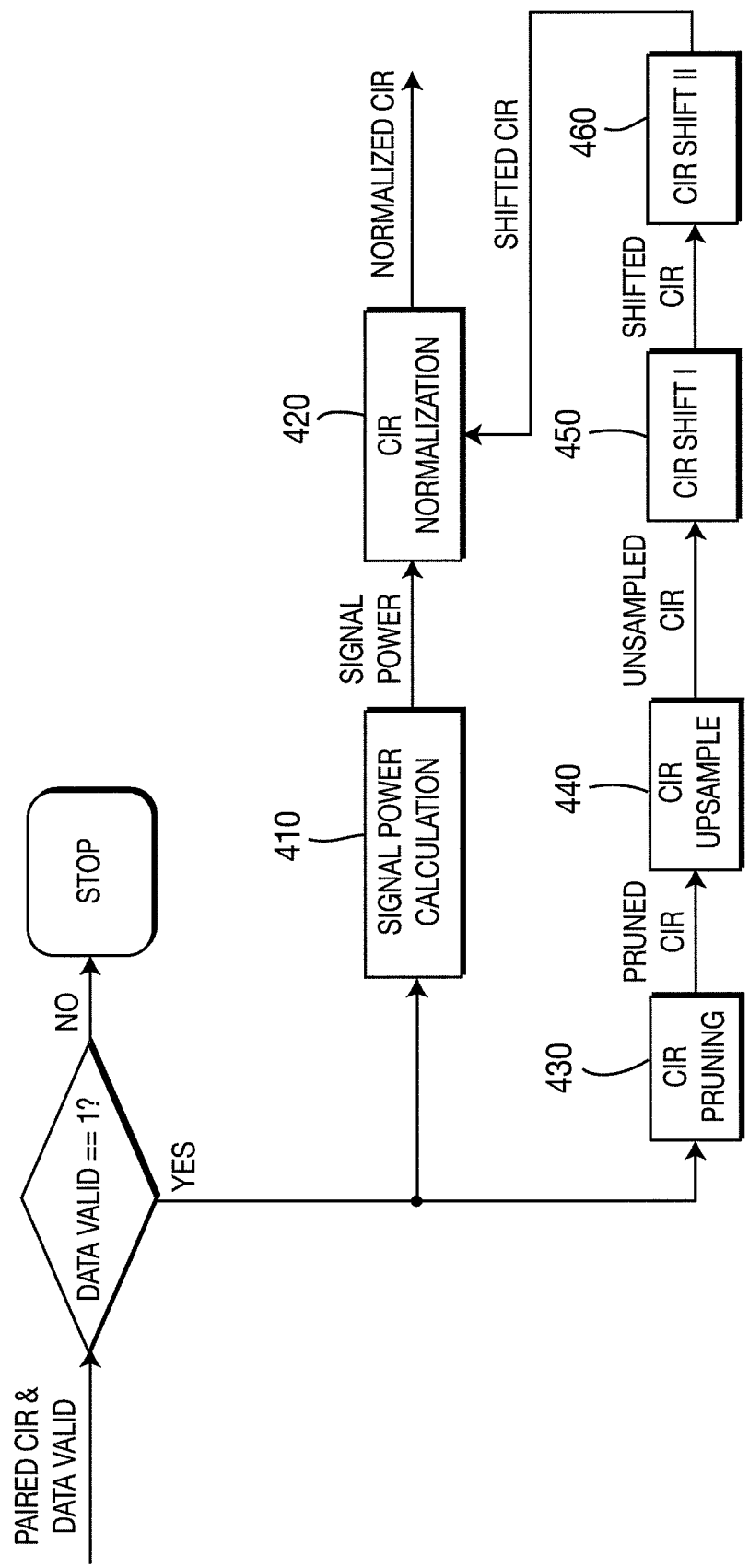
FIG. 4 shows an example flow chart of a CIR post-processing procedure.

FIG. 4 shows a block diagram of an example of CIR post-processing for aligning CIR data. A CIR post-processing unit includes a Signal Power Calculation unit 410, a CIR Normalization unit 420, a CIR Pruning unit 430, a CIR Upsampling unit 440, a first CIR Shift unit 450 and a second CIR Shift unit 460. Alternatively, CIR Shift unit 450 and CIR Shift unit 460 may be replaced with a single recursive shift unit (as shown in FIG. 5B).

The CIR pruning unit 430 reduces each CIR measurement so that only G samples remain in each measurement. As recited above, each of the CIR measurements includes 64 samples in a circular data structure, such that the last sample is before the first sample. For each CIR measurement, G samples are selected such that the sample with the largest magnitude is the middle sample. (G−1)/2 samples are selected before the middle sample, and (G−1)/2 samples are selected after the middle sample. The samples are reported to the CIR Upsampling unit 440, starting from the first selected sample, ending with $G^{th}$ sample, and wrapping around where necessary.

The pruned CIR data is then sent to the CIR Upsampling unit 440 to interpolate the CIR data to a higher sampling rate. For each CIR measurement in the pruned CIR data, G denotes the number of points in the CIR measurement, and B denotes the interpolation rate, a positive integer value.

For each CIR measurement in the pruned CIR data, B−1 zeros are inserted between each point of the CIR measurement to create a padded CIR measurement including (G−1)*B+1 points. A resampling finite impulse response (FIR) filter, which indicates the time between the input of the filter and the filter's peak response, is constructed with an oversampling rate of B, and convolved with the padded CIR sample to create a convolution of size G*B+2*B*C−B+1. The resampling FIR filter is a low pass filter, such that it has 2*B*C+1 points.

Alternatively, any standard low-pass filters may be used, for example, a sinc filter, a rcc filter, or a rc filter, may be used so long as the filter is appropriately truncated.

The first B*C and the last B*C of the convolution are ignored so that the middle G*B−B+1 points of the convolution are stored as the upsampled CIR data.

The upsampled CIR data is aligned at the CIR Shift units 450, 460 and reported to the CIR Normalization unit 420 which also receives the signal power of each CIR measurement from the Signal Power Calculation unit 410. The CIR Normalization unit 420 normalizes each shifted CIR measurement by dividing each point in each shifted CIR measurement by the square root of the signal power for that CIR measurement.

Figure 5A:
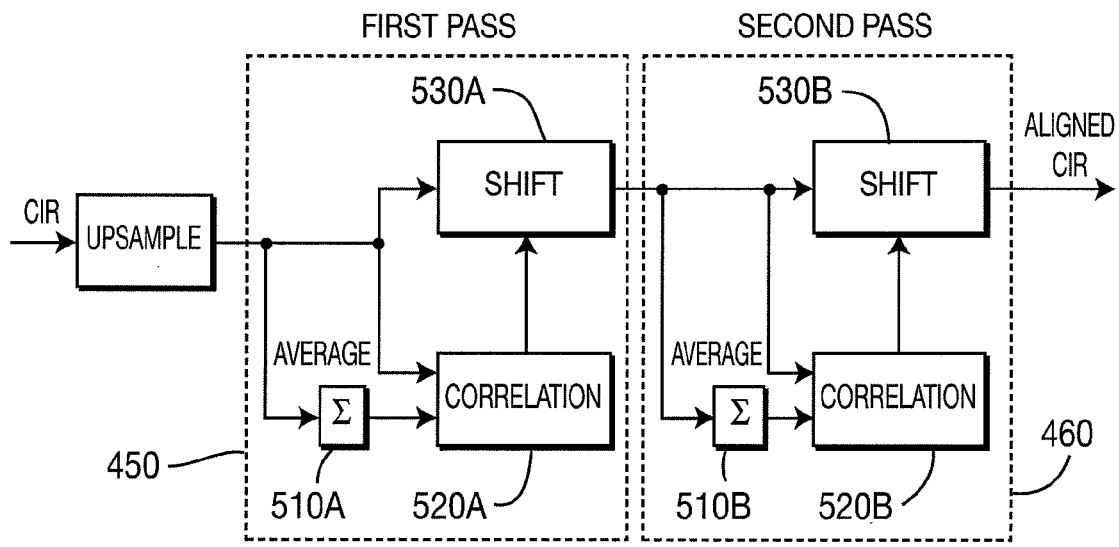
FIG. 5A shows an example block diagram of a CIR alignment unit.
Figure 5B:
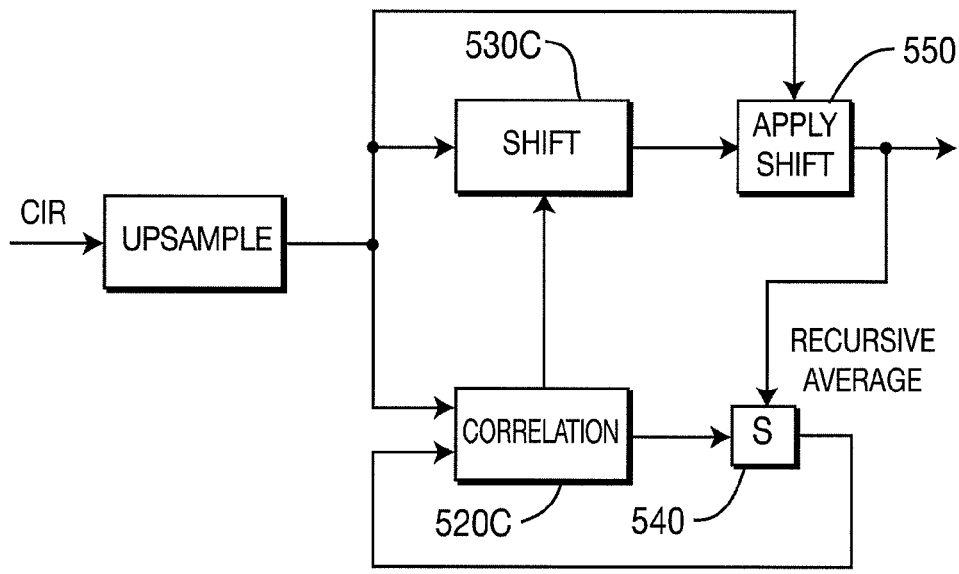
FIG. 5B shows an example block diagram of a recursive filter based CIR alignment unit.

FIG. 5A shows an example of CIR alignment in two passes using CIR Shift unit I 450, and CIR Shift unit II 460. Each CIR Shift unit 450, 460 includes an Averaging unit 510A, 510B, a Correlation unit 520A, 520B, and a Shift unit 530A, 530B. In the first pass, CIR Shift I 450 performs coarse alignment on each upsampled CIR measurement. In the second pass, CIR Shift II 460 performs fine alignment. The first pass removes relatively large timing errors and removes inaccuracies caused by large time shifts in some CIR data. The second pass may not be needed if the CIR data is already well aligned.

For each pass, the Averaging unit calculates the average CIR magnitude. The Average unit receives L CIR data (BLOCKSIZE), each containing A*B−B+1 points (CIRSIZE). Letting $CIR_{i,j}$, 1≤i≤BLOCKSIZE, 1≤j≤CIRSIZE, denote the jth point of the ith CIR measurement the magnitudes for each CIR measurement may be expressed as:

$$|CIR_i|=[|CIR_{i,1}|, \ldots , |CIR_{i,CIRSIZE}|] \qquad \text{Equation (1)}$$

The average CIR magnitude may then be expressed as:

$$|\overline{CIR}| = \lfloor |\overline{CIR_1}|, \ldots , |\overline{CIR_{CIRSIZE}}| \rfloor = \left[ \frac{1}{BLOCKSIZE} \sum_{i=1}^{BLOCKSIZE} |CIR_{i,1}|, \ldots , \frac{1}{BLOCKSIZE} \sum_{i=1}^{BLOCKSIZE} |CIR_{i,CIRSIZE}| \right]. \qquad \text{Equation (2)}$$

The CIR Correlation unit estimates the sampling time difference (shift) between each CIR and the averaged CIR, which contains the channel statistics information. The shift is estimated based on the correlation between the magnitude of each CIR in the CIR data and average CIR magnitude. A correlation window, W, and a threshold, THRE, are used to estimate the shift. The value of W is set to a positive integer, while the value of THRE is set to a number between 0 and 1.

Letting $|\overline{CIR}|$ denote the average CIR magnitude in the CIR data, and letting $CIR=[CIR_1, \ldots , CIR_{CIRSIZE}]$ denote a single CIR in the CIR the magnitude for the CIR may be expressed as:

$$|CIR|=[CIR_1|, \ldots , |CIR_{CIRSIZE}|]. \qquad \text{Equation (3)}$$

The correlation between $|\overline{CIR}|$ and a shifted $|CIR|$, with the shift range being from −W to W can then be calculated. For example, with a non-negative shift S≤W, the correlation may be expressed as:

$$\sum_{k=S}^{CIRSIZE-1} |CIR_{k+1}| \cdot |\overline{CIR}_{k-S+1}|. \qquad \text{Equation (4)}$$

For a negative shift S≥−W, the correlation may be expressed as:

$$\sum_{k=|S|}^{CIRSIZE-1} |CIR_{k-|S|+1}| \cdot |\overline{CIR}_{k+1}|. \qquad \text{Equation (5)}$$

The list of 2W+1 correlation values may be denoted by C(S), −W≤S≤W.

MAXCORR may denote the maximum value of C(S), such that, $$MAXCORR = \max_S C(S).$$

MINSHIFT may denote the smallest index whose corresponding correlation is above MAXCORR*THRE, such that, $$MINSHIFT = \min_{C(S)>MAXCORR*THRE} S.$$

MAXSHIFT may denote the largest index whose corresponding correlation is above MAXCORR*THRE, such that, $$MAXSHIFT = \max_{C(S)>MAXCORR*THRE} S.$$

Alternatively, MAXIND may denote the index of the maximum value in C(S), such that, $$MAXIND = \underset{S}{\operatorname{argmax}} C(S).$$

MINSHIFT may denote the smallest index below MAXIND such that C(S)≥MAXCORR*THRE for MINSHIFT≤S−

≤MAXIND. MAXSHIFT may denote the largest index above MAXIND such that C(S)≥MAXCORR*THRE for MAXIND≤S≤MAXSHIFT.

The estimated shift for the input CIR is set as the mean of MINSHIFT and MAXSHIFT, minus (W+1).

The shift unit performs a circular shift of each CIR, with the shift value estimated from the correlation block. Letting CIR=[$CIR_1, \ldots, CIR_{CIRSIZE}$] and its corresponding shift value equal S, the output CIR' may be expressed as:

$$CIR' = \begin{cases} [CIR_{S+1}, \ldots, CIR_{CIRSIZE}, & \text{if } S \geq 0 \\ CR_1, \ldots, CIR_S]; & \\ [CIR_{CIRSIZE-|S|+1}, \ldots, CIR_{CIRSIZE}, & \text{if } S < 0. \\ CIR_1, \ldots, CIR_{CIRSIZE-|S|}]; & \end{cases} \quad \text{Equation (6)}$$

FIG. 5B shows an alternative example of CIR alignment using a single Recursive CIR Shift unit. The Recursive CIR Shift unit includes a Correlation unit 520C, a Shift Calculation unit 530C, a Recursive Average unit 540, and a Shift unit 550. The Recursive CIR Shift unit receives a continuous stream of upsampled CIR samples and maintains a running average CIR value.

Correlation of the upsampled CIR data is performed as described above using the running average CIR value. A timing shift is determined and applied to the CIR signal. The running average CIR value is recalculated based on the average of the last N aligned CIRs and the newly aligned CIR. The time aligned CIR signal is reported to the CIR Normalization unit 420 (as shown in FIG. 4). Alternatively, the running average CIR value is recalculated using a recursive filter with an appropriate tunable filter bandwidth to optimize system performance. For example, the calculation may be expressed as CIR_N=(CIR_A+CIR_1)/2 or CIR_N=(L*CIR_A +CIR_1)/(L+1).

Figure 6:
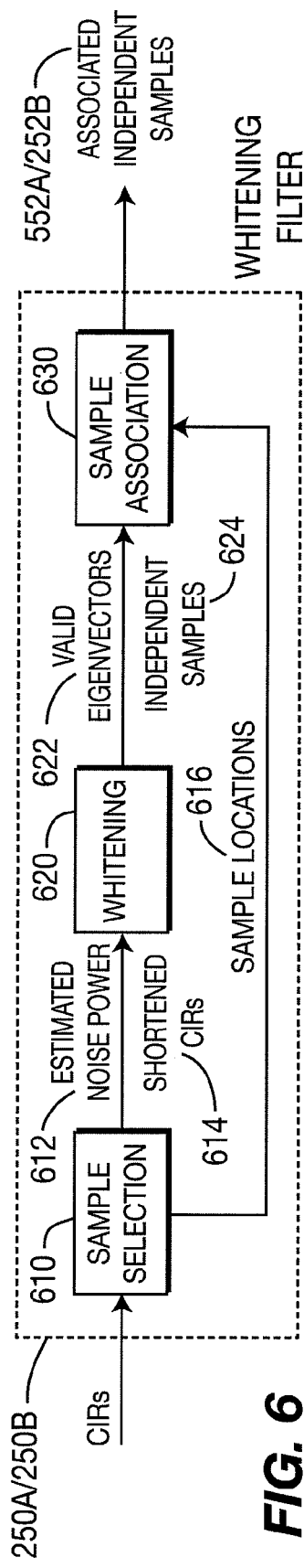
FIG. 6 shows an example block diagram of a data selection unit.

FIG. 6 shows an example of a data selection unit including a Sample Selection unit 610, a whitening unit 620 and a Sample Association unit 630. The delay spread of a channel is usually much less than the duration of a CIR, therefore most of the channel information is contained in a small portion of the CIR samples, this portion is selected by the data selection Unit.

The Sample Selection unit 610 selects at least one sample from the CIR data. A whitening process is applied to the selected CIR data by the whitening unit 620 and the samples are sorted by the Sample Association unit 630. The resultant whitened CIR data is sent to the secret key generation unit (116A, 116B as shown in FIG. 1). Increasing the number of CIR samples selected will increase the amount of channel information contained therein, and concurrently increase the computational complexity of the whitening filter. The number of samples selected varies depending on channel conditions and system resources, let V samples per CIR denote an acceptable tradeoff between accuracy and complexity.

The Sample Selection unit 610 calculates the average magnitude of each sample over all L CIR measurements. The largest average magnitude is the sample index, IND. For each CIR, the set of samples having an index between IND−V and IND+V is selected. The set of samples if further reduced to the samples with magnitudes equal to the largest magnitude in the selected samples. The selected samples (shortened CIRs) are sent to the whitening unit 620 where a whitening process is applied to de-correlate the set of selected samples. The location associated with each of the shortened CIRs is sent to the Sample Association unit 630.

Alternatively, the Sample Selection unit 610 calculates the magnitude of each sample for each CIR measurement. The V largest samples magnitude are selected and sent to the whitening unit 620 as described above. In another alternative, the Sample Selection unit 610 calculates the average magnitude of each sample for each CIR measurement. The V largest magnitude samples are selected for each CIR measurement. The selected samples are further reduced to the V samples having the most frequently occurring sample magnitudes.

The Sample Selection unit 610 also estimates the noise power 612 associated with the CIR data. Noise power may be estimated as the minimum variance over all CIR samples; the average power of received signals when no real signal is transmitted, or the transmitted signal is an all-zero sequence.

If several CIR measurements fall within a very short time frame, such as, a time frame that is much less than the channel coherence time, the CIR measurements may be treated as resulting from a single CIR. As a result, the difference of any two of the CIR measurements will have a noise component with doubled noise power. In this case, the estimated noise power 612 will be set as half the average difference, and may be expressed as:

$$\frac{\left[\frac{1}{x}\sum_{i=1}^{x}|A_i - B_i|^2\right]}{2}. \quad \text{Equation (7)}$$

Alternatively, noise power may instead be estimated by the whitening unit 1120, through the use of eigenvalues, as described below.

Figure 7:
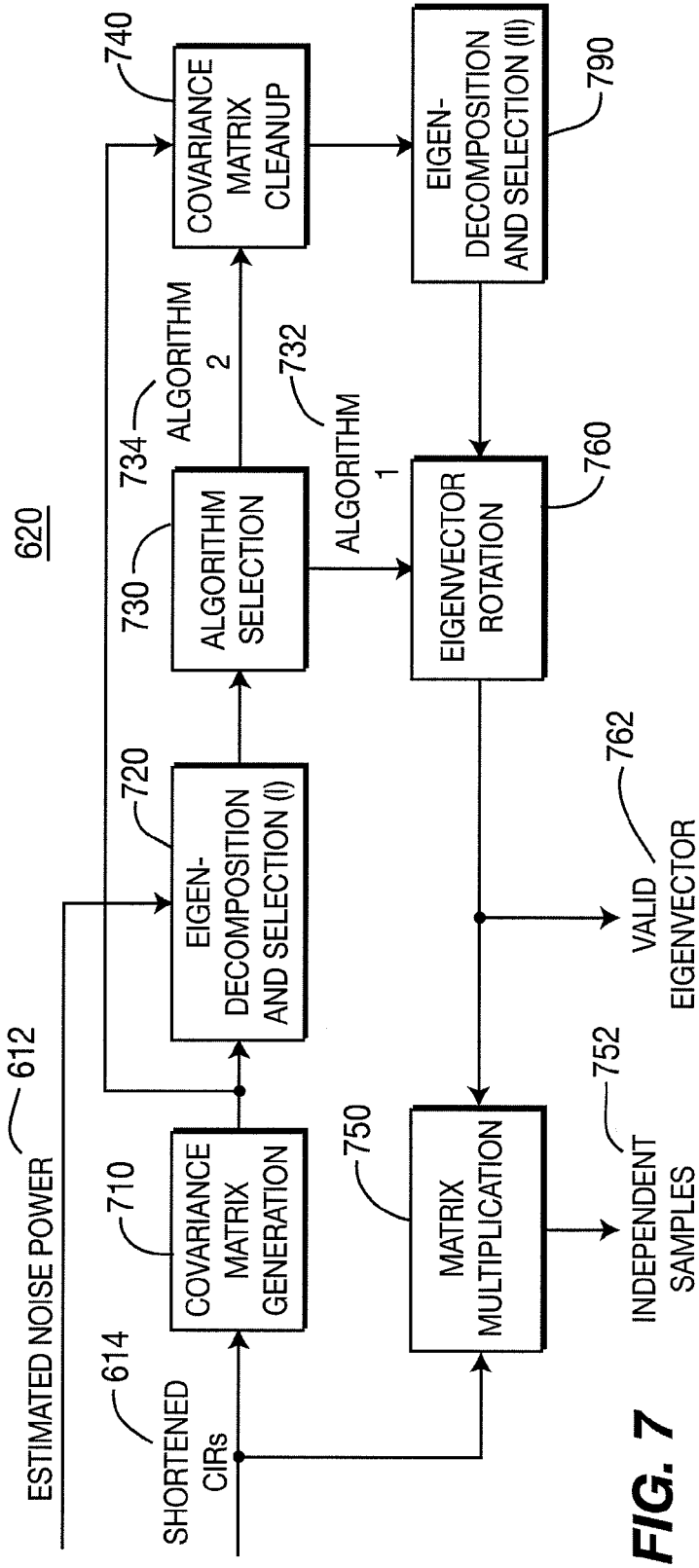
FIG. 7 shows an example block diagram of a whitening unit.

FIG. 7 shows an example of a whitening unit. The whitening unit includes a Covariance Matrix Generation unit 710, a first Eigen-decomposition and Selection unit 720, an Algorithm Selection unit 730, a Covariance Matrix Cleanup unit 740, a Matrix Multiplication unit 750, an Eigenvector Rotation unit 760, and a second Eigen-decomposition and Selection unit 790.

The shortened CIR measurements 614 are arranged in a V×L matrix (the input matrix). The V samples from each CIR measurement compose a row of the matrix, and the number of rows is equal to the number of shortened CIR measurements, L. Let $X_{i,j}$, 1≤i≤L, 1≤j≤V, denote the element of the $i^{th}$ row and the $j^{th}$ column of the matrix.

The Covariance Matrix Generation unit 710 generates a V×V covariance matrix from the input matrix. Letting $Y_{i,j}$, 1≤i, j≤V, denote the element of the $i^{th}$ row and the $j^{th}$ column of the covariance matrix, and $$\mu_j = \frac{1}{L}\sum_{i=1}^{L} X_{i,j},\ 1 \leq j \leq V$$

denote the mean over the $j^{th}$ column of the input matrix, the computation of the covariance matrix may be expressed as:

$$Y_{i,j} = \frac{1}{L}\sum_{k=1}^{L}(X_{k,i} - \mu_i)(X_{k,j} - \mu_j)^*. \quad \text{Equation (8)}$$

The covariance matrix is a Hermitian matrix and is positive semi-definite.

The first Eigen-decomposition and Selection unit 720 decomposes the covariance matrix to eigenvalues and an eigenvector matrix. The eigenvector matrix is a unitary matrix. Each column is an eigenvector of the covariance matrix, corresponding to a unique eigenvalue. Letting EIG denote the largest eigenvalue, and THRI denote a noise power threshold, all eigenvalues larger than $$\frac{EIG}{THR1}$$

are valid eigenvalues. All other eigenvalues are invalid as they may arise from noise. THRI may be set as $$\frac{C}{\text{noise power}},$$

where C is a constant. The denominator, noise power, may be the noise power estimate 612 provided by the Sample Selection unit 610 (as shown in FIG. 6). Alternatively, the denominator is the smallest eigenvalue when the covariance matrix is of high dimension and the number of CIR measurements, L, is large enough to achieve the statistical distribution. The valid eigenvalues, and their corresponding valid eigenvectors, are sorted by magnitude. Optionally, Alice and Bob agree on the number of valid eigenvalues.

The Algorithm Selection unit 730 sorts the eigenvalues and eigenvectors into two channel types, according to channel path power variation. The first channel type includes paths with significant variation in path power, and the samples are sorted by power. The second channel type includes paths with very similar path powers, and the samples are sorted by location.

The valid eigenvalues in the first channel type are characterized by significant variation in magnitude, while those in the second channel type are characterized by very similar magnitude. Therefore, the channel type is based on magnitude. The normalized variance of valid eigenvalues is the variance of the valid eigenvalues divided by the mean of the valid eigenvalues. If the normalized variance of a channel's valid eigenvalues is above a threshold, THR2, the channel is categorized to the first type; otherwise the channel is categorized to the second type.

The Covariance Matrix Cleanup unit 740 removes noise from the second channel type covariance matrix. The covariance matrix cleanup unit 740 sets $Y_{i,j}=0$, if $$Y_{i,j} \leq \frac{\min(Y_{i,j}, Y_{j,j})}{THR3},$$

where $Y_{i,j}$ is the element of the $i^{th}$ row and the $j^{th}$ column of the covariance matrix, and threshold THR3 is set as $\sqrt{s}$, where s is a constant.

The second Eigen-Decomposition and Selection unit 770 decomposes the covariance matrix for the second channel type to eigenvalues and an eigenvector matrix. The second Eigen-Decomposition and Selection unit 770 operates like the first Eigen-decomposition and Selection unit 720, except that the number of valid eigenvalues detected in the first Eigen-Decomposition and Selection unit 720 is used.

The Eigenvector Rotation unit 760 acquires the consistency on valid eigenvectors. The consistency is to keep both Alice and Bob's valid eigenvectors with the same angle. To do this, both Alice and Bob rotate the eigenvectors, by multiplying a unit phase factor, such that the element with the largest magnitude in the eigenvector becomes a positive real number. Other elements are complex numbers. The Eigenvector Rotation unit 760 multiplies each eigenvector by a unit phase factor such that the element with the largest magnitude in the eigenvector becomes a positive number. The rotated eigenvectors are then reported to the sample association unit 1130, and to the Matrix Multiplication unit 750.

The Matrix Multiplication unit 750 produces independent samples. Letting x denote the shortened L-sample CIR data, the covariance matrix of x may be expressed as $C_x=UDU^*$, where D is a diagonal matrix and U is a unitary matrix. Since $C_x$ is a Hermitian matrix and is positive semi-definite, the matrix U coincides with the eigenvector matrix of $C_x$. The covariance matrix of the product vector $y=xU$ may be expressed as:

$$C_y=E(y^*y)=E(U^*x^*xU)=U^*C_xU=U^*UDU^*U=D. \quad \text{Equation (9)}$$

The samples in y are uncorrelated with each other. Every sample in y is a Gaussian random variable because x is a Gaussian random vector. Thus, the samples in y are mutually independent.

A match between Alice and Bob's whitened samples will be made for the first channel type because their valid eigenvectors are arranged according to the magnitudes of their corresponding eigenvalues, and are therefore sorted by power. To better match the samples in the second channel type, the Sample Association unit 630 (as shown in FIG. 6), sorts the whitened samples by location.

The Sample Association unit 630 (as shown in FIG. 6) estimates the locations of each whitened sample and re-arranges the whitened samples according to the estimates. Letting $Z_1, \ldots, Z_{10}$ be the magnitudes of a valid eigenvector, for each valid eigenvector, the Sample Association unit 1130 sets $$Z_i = 0, \text{ if } Z_i < \frac{\max(Z_1, \ldots, Z_{10})}{THR4},$$

where THR4=1.18, normalizes $Z_1, \ldots, Z_{10}$, such that $$\sum_{i=1}^{10} Z_i = 1,$$

and takes the inner product $(Z_1, \ldots, Z_{10})$ with the sample locations obtained in the sample selection block. This provides the estimated location of the whitened sample corresponding to the given eigenvector. The whitened samples are rearranged in terms of their estimated locations.

Although the features and elements are described in the preferred embodiments in particular combinations, each feature or element can be used alone without the other features and elements of the preferred embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for generating a physical layer security key, the method comprising:
    at a first location, making local channel impulse response (CIR) measurements and associating them with local timestamps;
    at the first location, receiving timestamps from a second location, the received timestamps being associated with remote channel impulse response (CIR) measurements at the second location;
        at the first location, selecting a local timestamp of the local timestamps and associated local CIR measurement of the local CIR measurements using one of the received timestamps;
        at the first location, post-processing the selected local CIR measurement at the first location, selecting at least one sample from the post-processed CIR measurement; and
        at the first location, generating a physical layer secret key from the at least one selected sample wherein the one of the received timestamps is associated with a CIR measurement at the second location and wherein the selected local CIR measurement at the first location is thus paired with the CIR measurement at the second location.

2. The method of claim 1, wherein the selected local CIR measurement includes 64 complex samples.

3. The method of claim 1, further comprising
    validating the selected local CIR measurement.

4. The method of claim 1 further comprising: determining whether a first time stamp of the local timestamps is older than a stopping time; and deleting the first time stamp and the associated CIR measurement in response to a first time-stamp that is older than a stopping time.

5. The method of claim 1, wherein the post-processing includes: pruning the selected local CIR measurement; upsampling the pruned CIR measurement; and shifting the up sampled CIR measurement.

6. The method of claim 5, wherein the pruning includes; For the selected local CIR measurement, selecting a sequential plurality of samples, wherein the selected sequential plurality of samples has a largest magnitude sample in the middle.

7. The method of claim 5, wherein the upsampling includes: inserting a zero value sample between each sample in the selected local CIR measurement; constructing a resampling finite impulse response (AR) filter; convolving the resampling FIR filter with the selected local CIR measurement; and selecting a plurality of samples from the middle of the samples in the selected local CIR measurement.

8. The method of claim 1, wherein the selecting includes: determining a plurality of samples from the post-processed CIR measurements; whitening the determined plurality of samples; and sorting the whitened plurality of samples.

9. The method of claim 1, further comprising selecting the local time-stamp and the second remote time stamp from a list of paired time stamps generated by: comparing a first list of time-stamp pairing candidates with a second list of timestamp pairing candidates.

10. The method of claim 9, wherein the comparing includes: selecting a first time-stamp from a first plurality of time-stamps; selecting a second time-stamp from a second plurality of time-stamps; and comparing the first time-stamp and the second time-stamp if the first timestamp is not an impossible time-stamp value and the second time-stamp is not an impossible time-stamp value; selecting the next time-stamp in the first plurality of time-stamps as the first time-stamp if the first time-stamp is less than the second time stamp and the difference between the selected time-stamps is greater than a threshold; selecting the next time-stamp in the second plurality of time-stamps as the second time-stamp if the first time-stamp is greater than or equal to the second time stamp and the difference between the selected time-stamps is greater than a threshold; marking the selected time-stamps as paired if the difference between the selected time-stamps is less than or equal to a threshold, wherein marking includes selecting the next time stamp in the first plurality of time-stamps as the first timestamp, and selecting the next time-stamp in the second plurality of time-stamps; and iteratively repeating the selecting a first time stamp, the selecting a second time-stamp, the comparing, the selecting the next time-stamp in the first plurality, the selecting the next time-stamp in the second plurality, and the marking, for each timestamp in the first plurality of time-stamps, and for each time-stamp in the second plurality of time-stamps.

11. The method of claim 9, wherein the comparing includes: selecting a first time stamp from a first plurality of time-stamps; selecting a second time-stamp from a second plurality of tire-stamps; and comparing the first time-stamp and the second time-stamp if the first timestamp is not an impossible time-stamp value and the second time-stamp is not an impossible time-stamp value; selecting the next time-stamp in the first plurality of time-stamps as the first time-stamp if the first time-stamp is less than the second time stamp, the difference between the selected time-stamps is greater than a threshold, and the difference between the selected time-stamps is less than or equal to a time-stamp wrapping point; selecting the next time-stamp in the second plurality of time-stamps as the second time-stamp if the first time-stamp is less than the second time stamp, the difference between the selected time-stamps is greater than a threshold, the difference between the selected time-stamps is greater than a time-stamp wrapping point, and the difference between the selected time stamps less than or equal to the difference between a maximum time-stamp value and a threshold; selecting the next time-stamp in the second plurality of time stamps as the second time-stamp if the first time-stamp is greater than or equal to the second time stamp, the difference between the selected time-stamps is greater than a threshold, and the difference between the selected time-stamps is less than or equal to a timestamp wrapping point; selecting the next time-stamp in the first plurality of time-stamps as the first time-stamp if the first time stamp is greater than or equal to the second time stamp, the difference between the selected time-stamps is greater than a threshold, the difference between the selected time-stamps is greater than a time-stamp wrapping point, and the difference between the selected time stamps less than or equal to the difference between a maximum time-stamp value and a threshold; marking the selected time-stamps as paired if the difference between the selected time-stamps is less than or equal to a threshold, wherein marking includes selecting the next time-stamp in the first plurality of time-stamps as the first timestamp, and selecting the next time-stamp in the second plurality of time-stamps; and marking the selected time-stamps as paired if the difference between the selected time-stamps is greater than a threshold, the difference between the selected time-stamps is greater than a time-stamp wrapping point, and the difference between the selected time stamps less than or equal to the difference between a maximum timestamp value and a threshold, wherein marking includes selecting the next time-stamp in the first plurality of time-stamps as the first time-stamp, and selecting the next time-stamp in the second plurality of time-stamps; and iteratively repeating the selecting a first time-stamp, the selecting a second time-stamp, the comparing, the selecting the next time-stamp in the first plurality, the selecting the next time-stamp in the second plurality, and the marking, for each timestamp in the first plurality of time-stamps, and for each time-stamp in the second plurality of time-stamps.

12. The method of claim 9, wherein the comparing includes: selecting a first time-stamp from a first plurality of time-stamps; selecting a second time-stamp from a second plurality of time stamps; and comparing the first time-stamp and the second time-stamp if the first timestamp is not an impossible time-stamp value and the second time-stamp is not an impossible time-stamp value; selecting the next time-stamp in the first plurality of time-stamps as the first time-stamp if the first time-stamp is less than the second time stamp, the first timestamp is greater than or equal to a previous time-stamp in the first plurality of timestamps, the second time-stamp is less than or equal to a previous time stamp in the second plurality of time-stamps, and the difference between the selected time-stamps is greater than a threshold; selecting the next time-stamp in the second plurality of time-stamps as the second time-stamp if the first time-stamp is less than the second time stamp, the first time-stamp is less than to a previous time-stamp in the first plurality of time-stamps, the second time-stamp is greater than a previous time stamp in the second plurality of time-stamps, the difference between the selected time stamps less than the difference between a maximum time-stamp value and a threshold; selecting the next time-stamp in the second plurality of time-stamps as the second time-stamp if the first time-stamp is greater than or equal to the second time stamp, the first time-stamp is greater than a previous time-stamp in the first plurality of time-stamps, the second time-stamp is less than a previous time stamp in the second plurality of time-stamps, and the difference between the selected time-stamps is greater than a threshold; selecting the next time-stamp in the first plurality of time-stamps as the first time-stamp if the first time-stamp is greater than or equal to the second time stamp, the first time-stamp is greater than a previous time-stamp in the first plurality of timestamps, the second time-stamp is less than a previous time stamp in the second plurality of time-stamps, the difference between the selected time stamps less than the difference between a maximum time-stamp value and a threshold; marking the selected time-stamps as paired if the first time-stamp is less than the second time stamp, the first time-stamp is greater than or equal to a previous timestamp in the first plurality of time-stamps, the second time-stamp is less than or equal to a previous time stamp in the second plurality of time-stamps, and the difference between the selected time-stamps is less than or equal to a threshold, wherein marking includes selecting the next time-stamp in the first plurality of time-stamps as the first time-stamp, and selecting the next time-stamp in the second plurality of time-stamps; and marking the selected time-stamps as paired if the first time-stamp is less than the second time stamp, the first time-stamp is less than to a previous time-stamp in the first plurality of time-stamps, the second time-stamp is greater than a previous time stamp in the second plurality of time-stamps, the difference between the selected time stamps greater than or equal to the difference between a maximum time-stamp value and a threshold, wherein marking includes selecting the next time-stamp in the first plurality of time-stamps as the first time stamp, and selecting the next timestamp in the second plurality of time-stamps; and iteratively repeating the selecting a first time-stamp, the selecting a second time-stamp, the comparing, the selecting the next time-stamp in the first plurality, the selecting the next time-stamp in the second plurality, and the marking, for each time-stamp in the first plurality of time-stamps, and for each time-stamp in the second plurality of time-stamps.

13. A wireless transmit/receive unit (WTRU) for generating physical layer security keys, the WTRU comprising:
a channel impulse response (CIR) measurement unit configured to generate a first plurality of local CIR measurements, wherein each local CIR measurement is associated with a time-stamp;
a time-stamp pairing unit configured to identify a pair of timestamps, wherein one of the pair of timestamps is a local timestamp and another of the pair of timestamps is a remote timestamp and the local time-stamp is associated with a selected local CIR measurement in the plurality of local CIR measurements, and the remote time-stamp is associated with a remote CIR measurement wherein the selected local CIR measurement is thus paired with the remote CIR measurement at the remote location;
a CIR post-processing unit configured to post process the selected local CIR measurement;
a data selection unit configured to select at least one sample from the post-processed CIR measurement; and
a secret key generation unit configured to generate a physical layer secret key from the at least one selected sample.

14. The WTRU of claim 13, wherein the CIR post-processing unit includes: a CIR pruning unit configured to reduce the number of samples in the selected local CIR measurement; a CIR up sampling unit configured to interpolate the pruned CIR measurement to a higher sampling rate; a first CIR shift unit configured to align the upsampled CIR measurement; a signal power calculation unit configured to calculate a signal power of the CIR measurement; and a CIR normalization unit configured to normalize the shifted CIR measurement.

\* \* \* \* \*